(12) United States Patent
Huang et al.

(10) Patent No.: US 11,042,008 B2
(45) Date of Patent: Jun. 22, 2021

(54) IMAGING LENS

(71) Applicant: Bokkeh Co., Ltd., Taipei (TW)

(72) Inventors: Chun-Yu Huang, Taipei (TW); Yu Du, Shenzhen (CN)

(73) Assignee: Bokkeh Co., Ltd., Taipei (TW)

( * ) Notice: Subject to any disclaimer, the term of this patent is extended or adjusted under 35 U.S.C. 154(b) by 65 days.

(21) Appl. No.: 15/629,767

(22) Filed: Jun. 22, 2017

(65) Prior Publication Data

US 2018/0011226 A1    Jan. 11, 2018

(30) Foreign Application Priority Data

Jul. 8, 2016   (TW) .................... 105121661

(51) Int. Cl.
*G02B 13/00*   (2006.01)
*G02B 9/64*    (2006.01)

(52) U.S. Cl.
CPC ............ *G02B 13/0045* (2013.01); *G02B 9/64* (2013.01)

(58) Field of Classification Search
CPC .............. G02B 3/04; G02B 9/00–64; G02B 13/002–0045; G02B 13/02; G02B 13/04; G02B 13/18; G02B 15/00–28
USPC .............. 359/676–695, 708–718, 745–795
See application file for complete search history.

(56) References Cited

U.S. PATENT DOCUMENTS

| | | | | |
|---|---|---|---|---|
| 4,770,509 A | * | 9/1988 | Hayashi | G02B 15/177 359/682 |
| 6,549,343 B2 | * | 4/2003 | Yoneyama | G02B 13/02 359/745 |
| 7,027,236 B2 | * | 4/2006 | Nishina | G02B 9/36 359/688 |
| 7,715,116 B2 | * | 5/2010 | Kato | G02B 13/20 359/745 |
| 7,885,008 B2 | * | 2/2011 | Schau.beta. | G02B 13/22 359/649 |
| 2015/0293327 A1 | * | 10/2015 | Tomioka | G02B 13/02 359/754 |

FOREIGN PATENT DOCUMENTS

| | | | |
|---|---|---|---|
| CN | 202615028 | | 12/2012 |
| CN | 103558677 A | * | 2/2014 |
| CN | 103558677 | | 11/2015 |
| JP | 2012042766 | | 3/2012 |
| JP | 2012042766 A | * | 3/2012 |
| WO | WO-2014097570 A1 | * | 6/2014 ......... G02B 27/0025 |

OTHER PUBLICATIONS

English machine translation of CN-103558677-A (Year: 2014).*
English machine translation of JP-2012042766-A (Year: 2012).*

* cited by examiner

*Primary Examiner* — Nicholas R. Pasko

(57) ABSTRACT

An imaging lens includes a first lens, a second lens, a third lens, a fourth lens, a fifth lens, a sixth lens, a seventh lens and an eighth lens sequentially arranged from a magnifying side to a narrowing side. The second lens and the third lens constitute a first composite lens, the fourth lens and the fifth lens constitute a second composite lens, and the sixth lens and the seventh lens constitute a third composite lens. The imaging lens has the advantages of small size and good imaging quality.

13 Claims, 15 Drawing Sheets

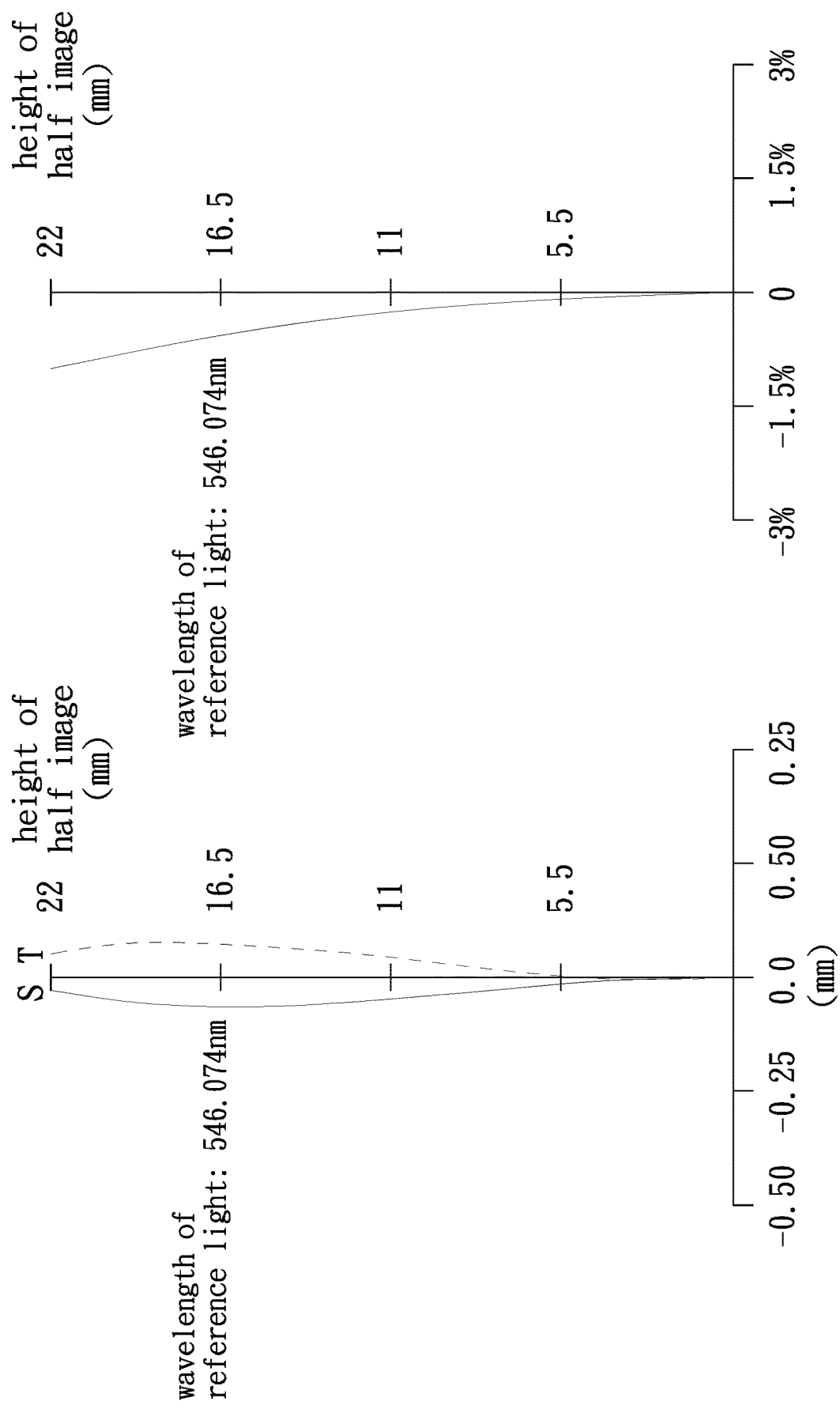

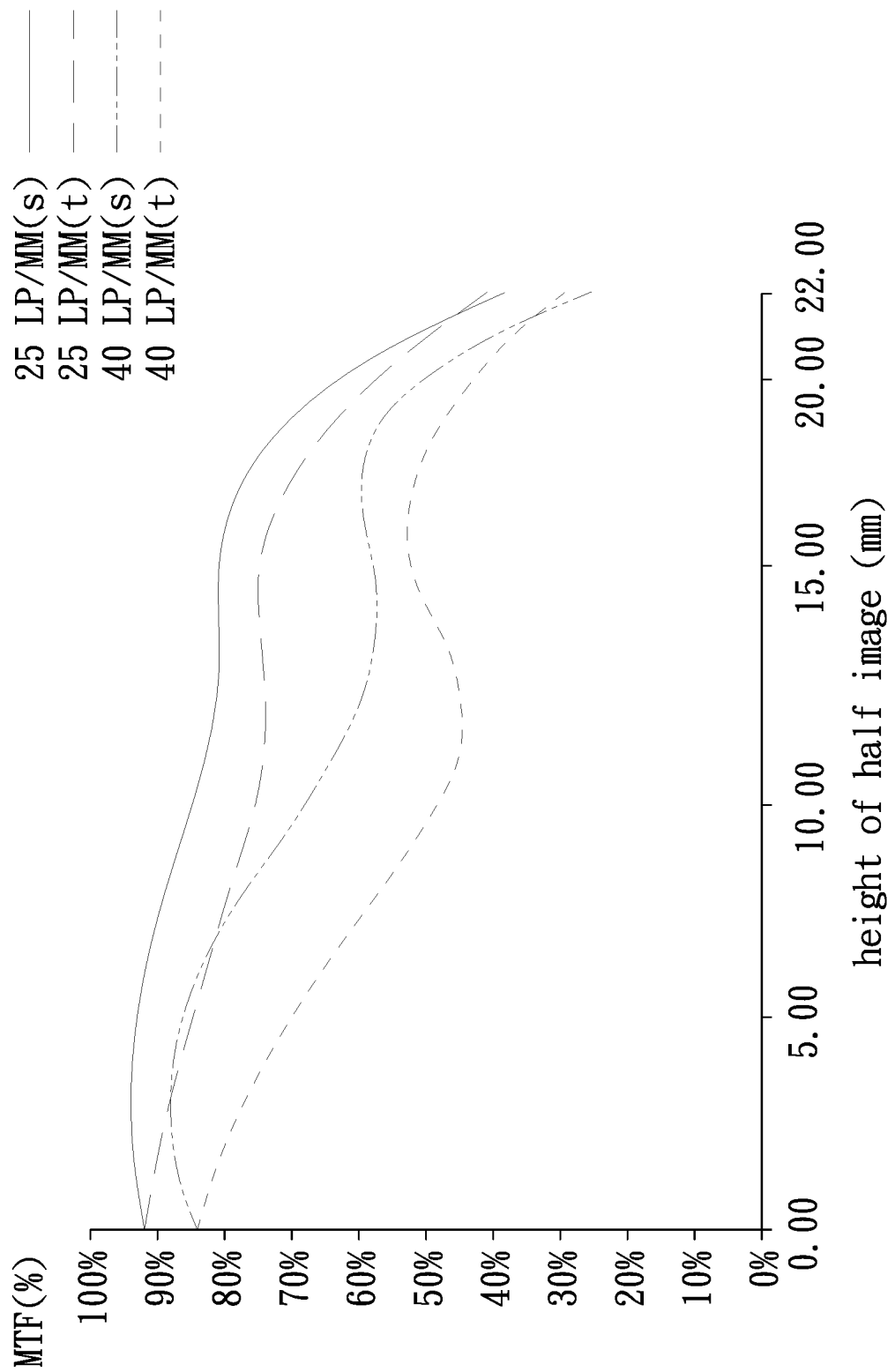

IMAGING LENS

TECHNICAL FIELD

The present invention relates to an optical element, and more particularly to an imaging lens.

BACKGROUND

The image capturing device (e.g., a camera) captures an image of an object side mainly by an imaging lens and an image sensing element. The imaging lens can be used to focus the beam from the object side on the image sensing element, and the image sensing element is used to sense the image. Therefore, the imaging quality is usually associated with the performances of the imaging lens and the image sensing element.

A good image sensing elements requires a good quality imaging lens to fully demonstrate the performance of image sensing element. A good imaging lens is generally required to have advantages such as low aberration, high resolution, and the like, and the size and cost of the imaging lens are also needed to be concerned in the design phase. Therefore, how to design an imaging lens having a good imaging quality under a condition of balancing the size and cost factors is a major problem for the designer.

SUMMARY

The present invention provides an imaging lens having the advantages of small size, low cost and good imaging quality.

In order to achieve the above-mentioned advantages, the present invention provides an imaging lens, which includes a first lens, a second lens, a third lens, a fourth lens, a fifth lens, a sixth lens, a seventh lens and an eighth lens sequentially arranged from a magnifying side to a narrowing side. The second lens and the third lens constitute a first composite lens, the fourth lens and the fifth lens constitute a second composite lens, and the sixth lens and the seventh lens constitute a third composite lens.

In an embodiment of the present invention, the first lens has a positive refractive power, the second lens has a positive refractive power, the third lens has a negative refractive power or a positive refractive power, the fourth lens has a negative refractive power, the fifth lens has a positive refractive power, the sixth lens has a negative refractive power, the seventh lens has a positive refractive power, and the eighth lens has a positive refractive power.

In an embodiment of the present invention, the first lens is a biconvex lens or a meniscus shaped lens or a plano-convex lens bulging toward the magnifying side.

In an embodiment of the present invention, a surface of the second lens facing the magnifying side is a convex curved surface, a surface of the third lens facing the narrowing side is a concave curved surface, and a joining surface between the second lens and the third lens is a flat surface or a curved surface bulging toward the magnifying side or the narrowing side.

In an embodiment of the present invention, a surface of the fourth lens facing the magnifying side is a concave curved surface, a surface of the fifth lens facing the narrowing side is a convex curved surface, and a joining surface between the fourth lens and the fifth lens is a curved surface bulging toward the magnifying side.

In an embodiment of the present invention, a surface of the sixth lens facing the magnifying side is a concave curved surface, a surface of the seventh lens facing the narrowing side is a convex curved surface, and a joining surface between the sixth lens and the seventh lens is a flat surface or a curved surface bulging toward the magnifying side or the narrowing side.

In an embodiment of the present invention, the eighth lens is a biconvex lens, a meniscus shaped lens or a plano-convex lens.

In an embodiment of the present invention, the imaging lens further includes an aperture stop disposed between the third lens and the fourth lens.

In an embodiment of the present invention, the imaging lens further includes a ninth lens disposed in one of the following positions: between the fifth lens and the sixth lens, between the first lens and the magnifying side, between the first lens and the second lens, between the seventh lens and the eighth lens, between the eighth lens and the narrowing side, between the third lens and the aperture stop, and between the aperture stop and the fourth lens.

In an embodiment of the present invention, the ninth lens is disposed between the fifth lens and the sixth lens, and the ninth lens is a meniscus shaped lens or a biconvex lens having a positive refractive power.

In an embodiment of the present invention, when the ninth lens is disposed between the first lens and the magnifying side or between the first lens and the second lens, a material of the ninth lens includes a crown glass, a light crown glass or a fluorine crown glass; when the ninth lens is disposed between the seventh lens and the eighth lens or between the eighth lens and the narrowing side, a material of the ninth lens includes a lanthanide glass, a dense lanthanide glass or a dense flint glass; and when the ninth lens is disposed between the fifth lens and the sixth lens, a material of the ninth lens includes a lanthanide glass or a dense lanthanide glass.

In an embodiment of the present invention, a material of the first lens includes a flint glass or a dense flint glass; a material of one of the second lens and the third lens includes a crown glass, and a material of another one of the second lens and the third lens includes a dense flint glass; a material of one of the fourth lens and the fifth lens includes a flint glass, and a material of another one of the fourth lens and the fifth lens includes a crown glass; a material of the sixth lens and the seventh lens includes a flint glass; and a material of the eighth lens includes a lanthanide glass, a dense lanthanide glass or a dense flint glass.

In an embodiment of the present invention, an angle of a full field of view of the imaging lens is between 10 degrees and 50 degrees.

The imaging lens of the present invention is advantageous in its low cost as only at least eight lenses are required. Further, by constituting six of the eight lenses as three composite lenses, the total length of the imaging lens can be reduced. Therefore, the imaging lens of the present invention can have good imaging quality while meeting the requirements of cost and size.

BRIEF DESCRIPTION OF THE DRAWINGS

The present disclosure will become more readily apparent to those ordinarily skilled in the art after reviewing the following detailed description and accompanying drawings, in which:

FIG. 4A is a plot of the astigmatism and curvature of field of an embodiment of the imaging lens in FIG. 3;

FIG. 4B is a plot of the distortion of an embodiment of the imaging lens in FIG. 3;

FIG. 6C is a plot of the modulation transfer function of an embodiment of the imaging lens in FIG. 5;

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

The imaging lens of each of the embodiments of the present invention may have a medium focal length or a medium large focal length, and the angle of its field of view is, for example, 5 to 40 degrees, but is not limited thereto. The imaging lens can be applied to static or dynamic image capture devices, including video cameras, picture cameras, monitoring devices, machine vision devices, etc., but is not limited thereto. For example, the imaging lens may also be applied to a projection device. A plurality of embodiments of the imaging lens of the present invention will be described in detail below.

Figure 1:
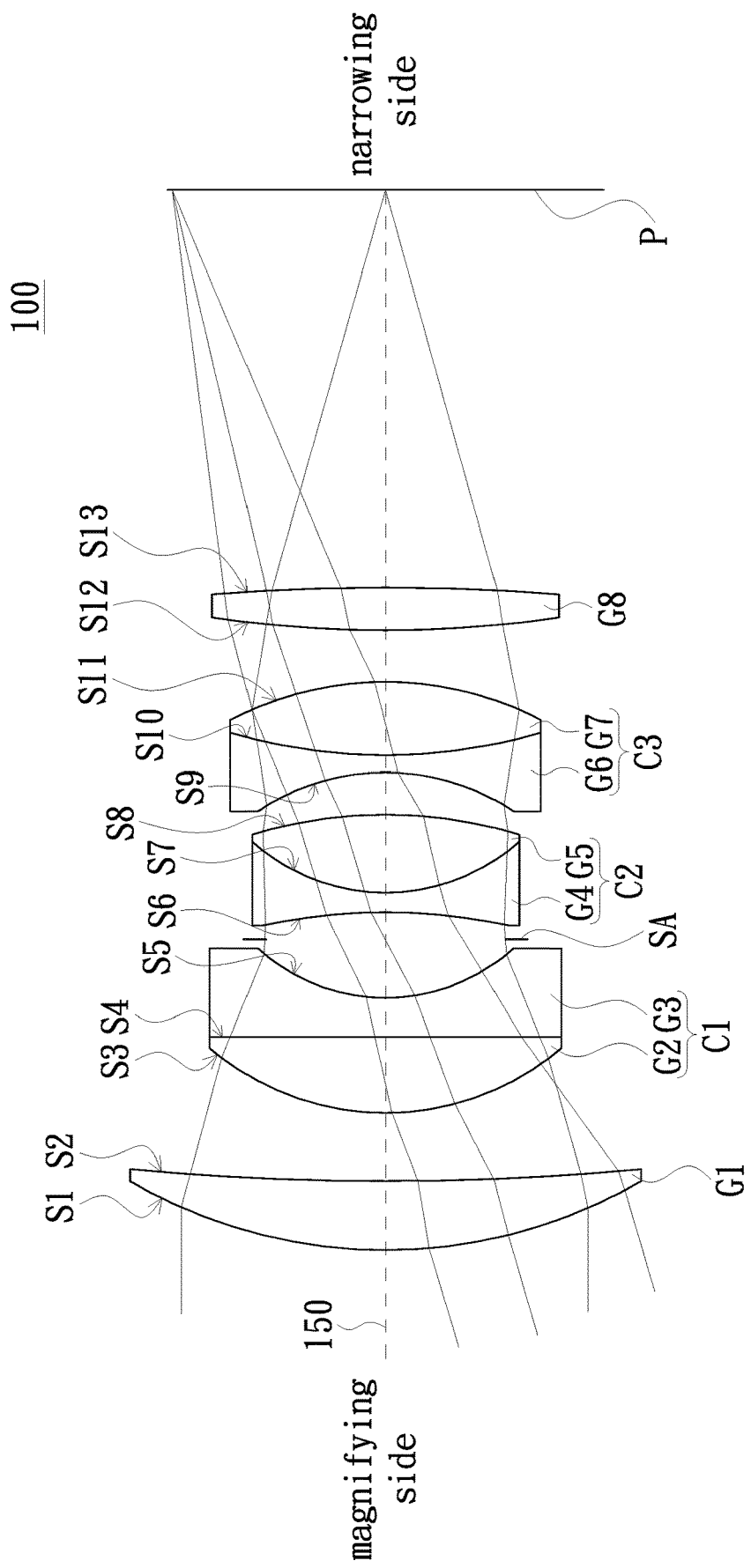
FIG. 1 is a schematic view of an imaging lens in accordance with an embodiment of the present invention.

FIG. 1 is a schematic view of an imaging lens in accordance with an embodiment of the present invention. Referring to FIG. 1. The imaging lens 100 may be a fixed focus lens, which includes a first lens G1, a second lens G2, a third lens G3, a fourth lens G4, a fifth lens G5, a sixth lens G6, a seventh lens G7 and an eighth lens G8 sequentially arranged from a magnifying side to a narrowing side. The second lens G2 and the third lens G3 constitute a first composite lens C1, the fourth lens G4 and the fifth lens G5 constitute a second composite lens C2, and the sixth lens G6 and the seventh lens G7 constitute a third composite lens C3. When the imaging lens 100 is applied to an image capture device, the element P disposed on the narrowing side is, for example, an image sensing element of the image capture device, and the imaging lens 100 is used to image the object on the magnifying side to the image sensing element. When the imaging lens 100 is applied to a projection device, the element P disposed on the narrowing side is, for example, a light valve of the projection device, and the imaging lens 100 is used to project the image beam from the light valve to the screen on the magnifying side.

The first lens G1 has a positive refractive power, the second lens G2 has a positive refractive power, the third lens G3 has a negative refractive power, the fourth lens G4 has a negative refractive power, the fifth lens G5 has a positive refractive power, the sixth lens G6 has a negative refractive power, the seventh lens G7 has a positive refractive power, and the eighth lens G8 has a positive refractive power, for example.

The first lens G1 is, for example, a meniscus shaped lens bulging toward the magnifying side, that is, the surface S1 of the first lens G1 facing the magnifying side is a convex curved surface and the surface S2 facing the narrowing side is concave curved surface, but the first lens G1 is not Limited to a meniscus shaped lens. For example, the first lens G1 may be a plano-convex lens or a biconvex lens. In addition, the material of the first lens G1 may be selected from materials having a high refractive index and high dispersion, such as a flint glass or a dense flint glass.

The surface S3 of the second lens G2 facing the magnifying side is, for example, a convex curved surface, the surface S5 of the third lens G3 facing the narrowing side is, for example, a concave curved surface, and the joining surface S4 between the second lens G2 and the third lens G3 is, for example, a flat surface. In other embodiments, the joining surface S4 may be a curved surface bulging toward the magnifying side or the narrowing side. In addition, the material of one of the second lens G2 and the third lens G3 includes, for example, a crown glass, and the material of the other one of the second lens G2 and the third lens G3 includes, for example, a dense flint glass. For example, the material of the second lens G2 is, for example, a crown glass, and the material of the third lens G3 is, for example, a dense flint glass. In another embodiment, the material of the second lens G2 is, for example, a dense flint glass, and the material of the third lens G3 is, for example, a crown glass.

The surface S6 of the fourth lens G4 facing the magnifying side is, for example, a concave curved surface, the surface S8 of the fifth lens G5 facing the narrowing side is, for example, a convex curved surface, and the joining surface S7 between the fourth lens G4 and the fifth lens G5 is, for example, a curved surface bulging toward the magnifying side. In addition, the materials of the fourth lens G4 and the fifth lens G5 may be selected from two materials having a close refractive index and a relatively large dispersion coefficient, thereby eliminating the dispersion. Specifically, the material of one of the fourth lens G4 and the fifth lens G5 includes, for example, a flint glass, and the material of the other one of the fourth lens G4 and the fifth lens G5 includes, for example, a crown glass. For example, the material of the fourth lens G4 is a flint glass, and the material of the fifth lens G5 is a crown glass. In another embodiment, the material of the fourth lens G4 is a crown glass, and the material of the fifth lens G5 is a flint glass.

The surface S9 of the sixth lens G6 facing the magnifying side is, for example, a concave curved surface, the surface S11 of the seventh lens G7 facing the narrowing side is, for example, a convex curved surface, and the joining surface S10 between the sixth lens G6 and the seventh lens G7 is, for example, curved surface bulging toward the magnifying side. In other embodiments, the joining surface S10 may be a flat surface or a curved surface bulging toward the narrowing side. In addition, in general, the refractive index of flint glass is between 1.63 and 2.1, and the materials of the sixth lens G6 and the seventh lens G7 may be selected from a group of flint glasses having similar dispersion coefficients but relatively large differences in refractive indices, thereby eliminating the image difference. In one embodiment, the absolute value of the difference between the refractive indices of the sixth lens G6 and the seventh lens G7 is, for example, greater than 0.15.

The eighth lens G8 is a biconvex lens for example, that is, the surface S12 of the eighth lens G8 facing the magnifying side is, for example, a convex curved surface and the surface S13 of the eighth lens G8 facing the narrowing side is, for example, a convex curved surface. In other embodiments, the eighth lens G8 may be a plano-convex lens or a meniscus shaped lens, wherein its convex curved surface may be bulging toward the magnifying side or the narrowing side. The material of the eighth lens G8 is selected from, for example, materials having a high refractive index, such as a lanthanide glass or a dense lanthanide glass having a low dispersion. In other embodiments, the material of the eighth lens G8 may be a dense flint glass.

The imaging lens 100 of the present embodiment further includes, for example, an aperture stop SA disposed between the third lens G3 and the fourth lens G4. In addition, the angle of the full field of view of the imaging lens 100 of the present embodiment is, for example, between 10 degrees and 50 degrees, but is not limited thereto. In one embodiment, the angle of the full field of view can be designed to be between 10 degrees and 15 degrees.

The imaging lens 100 of the present embodiment requires only eight lenses and therefore has an advantage of low cost. Further, by constituting six of the eight lenses as the three composite lenses, the total length of the imaging lens 100 can be reduced. Therefore, the imaging lens 100 of the present embodiment can have good imaging quality while meeting the requirements of cost and size.

Table 1 illustrates an embodiment of the parameters of the imaging lens 100. It is to be noted that the data listed in Table 1 is not intended to limit the present invention. That is, any person skilled in the art can make an appropriate change to the parameters or settings after reference to the present invention, and the changed parameters or settings are still within the scope of the present invention.

TABLE 1

| Element | Surface | Radius of Curvature (mm) | Spacing (mm) | Refractive Index | Abbe Number |
|---------|---------|--------------------------|--------------|------------------|-------------|
| G1 | S1 | 51.6 | 6.9 | 1.85 | 23.8 |
|    | S2 | 233.5 | 7 | | |
| G2 | S3 | 27 | 7.6 | 1.6 | 32.1 |
| G3 | S4 | Infinitely Large | 4 | 1.8 | 25.4 |
|    | S5 | 19.4 | 5.9 | | |
| SA | SA | Infinitely Large | 2.8 | | |
| G4 | S6 | −58 | 2 | 1.75 | 27.5 |
| G5 | S7 | 20 | 7.9 | 1.75 | 52.3 |

TABLE 1-continued

| Element | Surface | Radius of Curvature (mm) | Spacing (mm) | Refractive Index | Abbe Number |
|---------|---------|--------------------------|--------------|------------------|-------------|
|    | S8 | −45.8 | 4 | | |
| G6 | S9 | −24.3 | 2 | 1.7 | 44.7 |
| G7 | S10 | 56.1 | 7.3 | 1.85 | 23.8 |
|    | S11 | −31.9 | 5.3 | | |
| G8 | S12 | 143.3 | 4 | 1.88 | 40.8 |
|    | S13 | −327.6 | 47.85 | | |

The spacing in Table 1 is referred to the straight line distance between two adjacent surfaces on the optical axis 150 of the imaging lens 100. For example, the spacing of the surface S1 refers to the straight line distance between the surface S1 and the surface S2 on the optical axis 150, and the spacing of the surface S13 refers to the straight line distance between the surface S13 and the element P on the optical axis 150. The surface having a positive radius of curvature represents that the surface is bent toward the magnifying side, and the surface having a negative radius of curvature represents that the surface is bent toward the narrowing side.

Figures 2A, 2B:
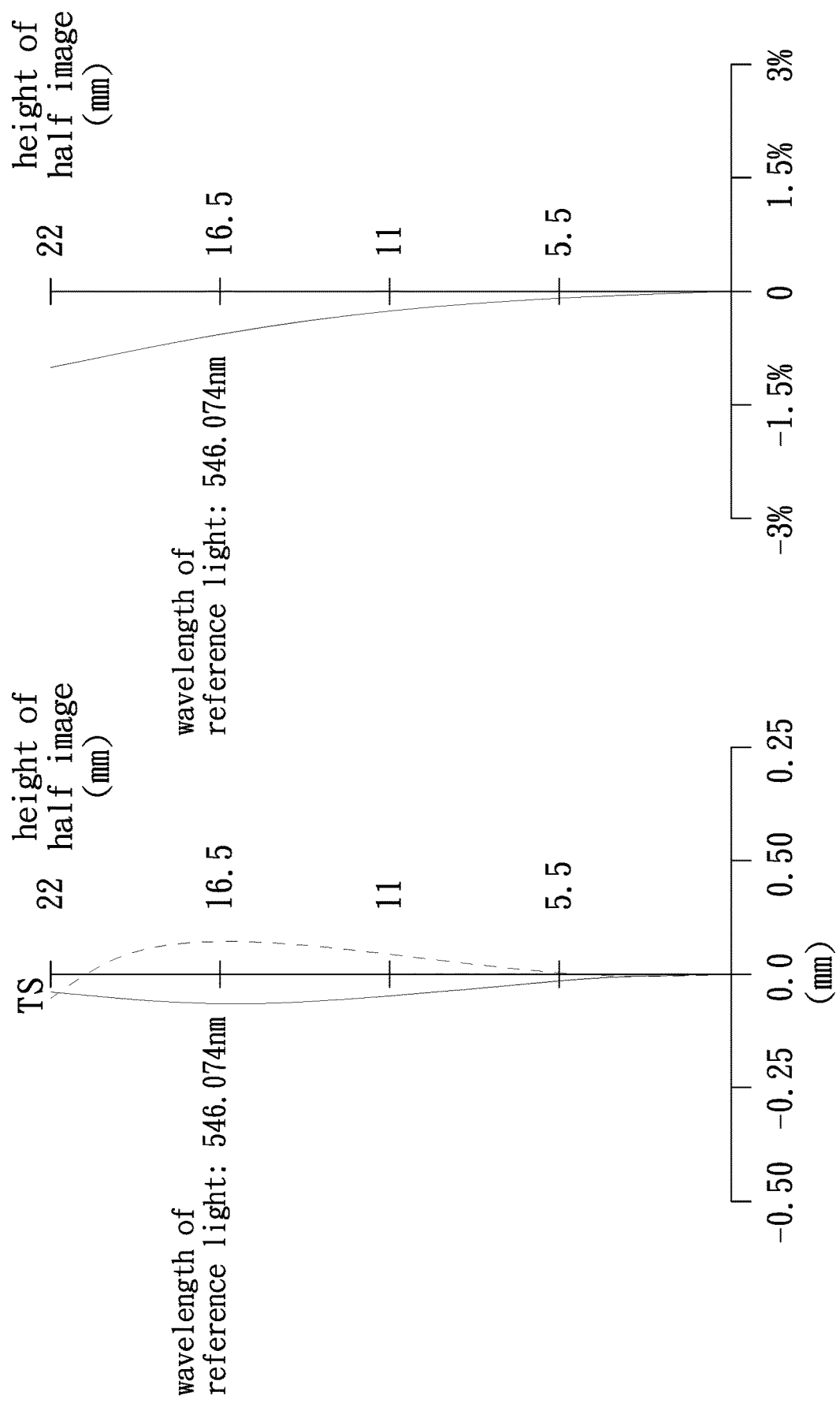
FIG. 2A is a plot of the astigmatism and curvature of field of an embodiment of the imaging lens in FIG. 1.
FIG. 2B is a plot of the distortion of an embodiment of the imaging lens in FIG. 1.
Figure 2C:
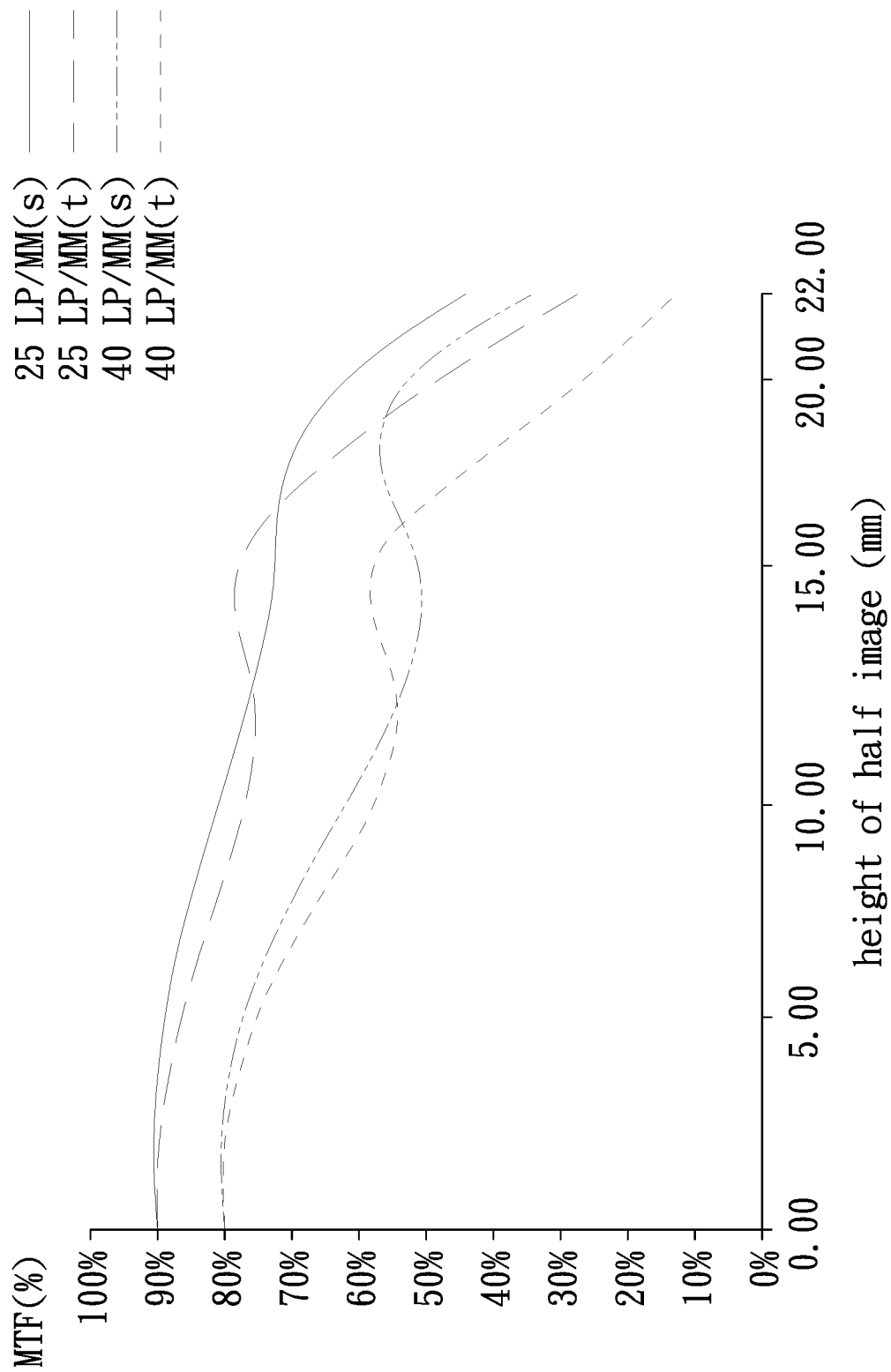
FIG. 2C is a plot of the modulation transfer function of an embodiment of the imaging lens in FIG. 1.

FIG. 2A is a plot of the astigmatism and curvature of field of an embodiment of the imaging lens in FIG. 1, FIG. 2B is a plot of the distortion of an embodiment of the imaging lens in FIG. 1, and FIG. 2C is a plot of the modulation transfer function (MTF) of an embodiment of the imaging lens in FIG. 1. As shown in FIGS. 2A to 2C, the imaging lens 100 of the present embodiment has good imaging quality while meeting the requirements of cost and size.

Although the above third lens G3 is exemplified by having a negative refractive power, the third lens G3 may be designed to have a positive refractive power in response to the different design requirements in another embodiment. In addition, in other embodiments, the imaging lens may further include one or more lenses. For example, the imaging lens may further include a ninth lens (not shown), and the ninth lens may be disposed in one of the following positions: between the first lens G1 and the magnifying side, between the first lens G1 and the second lens G2, between the seventh lens G7 and the eighth lens G8, between the eighth lens G8 and the narrowing side, between the third lens G3 and the aperture stop SA, between the aperture stop SA and the fourth lens G4, or between the fifth lens G5 and the sixth lens G6. A plurality of different embodiments will be described below in conjunction with the drawings.

Figure 3:
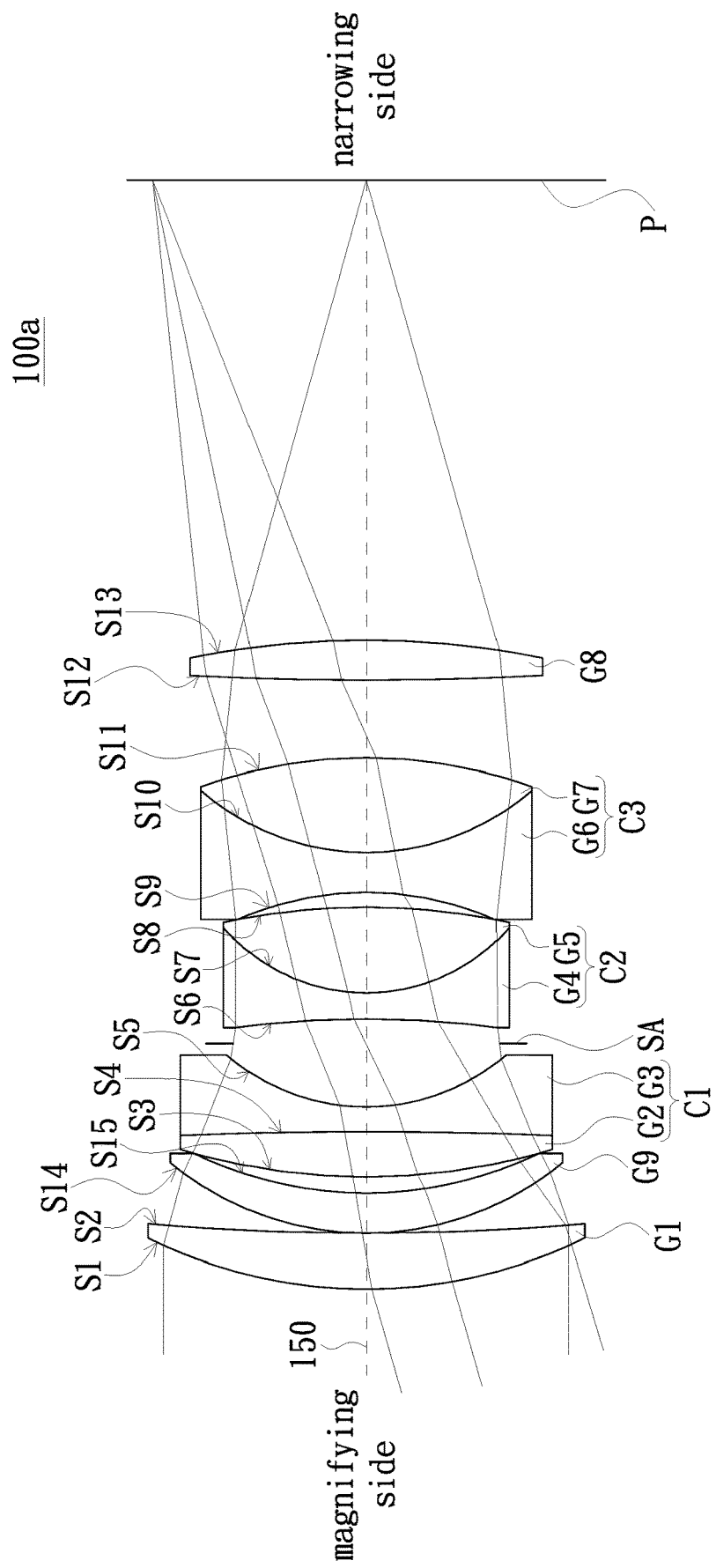
FIG. 3 is a schematic view of an imaging lens in accordance with another embodiment of the present invention.

FIG. 3 is a schematic view of an imaging lens in accordance with another embodiment of the present invention. Referring to FIG. 3. The imaging lens 100a of the present embodiment is similar to the imaging lens 100 of FIG. 1, and the main difference between the two is that the imaging lens 100a further includes a ninth lens G9 disposed between the first lens G1 and the second lens G2. The ninth lens G9 of the present embodiment has, for example, a positive refractive power. However, the ninth lens G9 may have a negative refractive power in another embodiment. In addition, in another embodiment, the ninth lens G9 may be disposed between the first lens G1 and the magnifying side. In addition, when the ninth lens G9 is disposed between the first lens G1 and the magnifying side or between the first lens G1 and the second lens G2, the material of the ninth lens G9 includes, for example, a crown glass, a light crown glass or a fluorine crown glass.

Table 2 illustrates an embodiment of the parameters of the imaging lens 100a. It is to be noted that the data listed in Table 2 is not intended to limit the present invention. That is, any person skilled in the art can make an appropriate change to the parameters or settings after reference to the present invention, and the changed parameters or settings are still within the scope of the present invention.

TABLE 2

| Element | Surface | Radius of Curvature (mm) | Spacing (mm) | Refractive Index | Abbe Number |
|---|---|---|---|---|---|
| G1 | S1 | 50.2 | 5 | 1.92 | 20.9 |
|  | S2 | 290 | 0.5 |  |  |
| G9 | S14 | 32.3 | 3.9 | 1.88 | 40.8 |
|  | S15 | 41.5 | 1.7 |  |  |
| G2 | S3 | 70 | 4.8 | 1.68 | 58.8 |
| G3 | S4 | −314 | 2 | 1.72 | 24.5 |
|  | S5 | 21.7 | 6 |  |  |
| SA | SA | Infinitely Large | 2.6 |  |  |
| G4 | S6 | −86 | 3.5 | 1.85 | 23.4 |
| G5 | S7 | 18.5 | 8.5 | 1.81 | 43.6 |
|  | S8 | −59 | 1.6 |  |  |
| G6 | S9 | −32.8 | 4 | 1.92 | 20.9 |
| G7 | S10 | 25 | 10 | 1.88 | 40.8 |
|  | S11 | −47.25 | 8.2 |  |  |
| G8 | S12 | 308 | 4 | 1.88 | 40.8 |
|  | S13 | −95.1 | 46.18 |  |  |

Figure 4C:
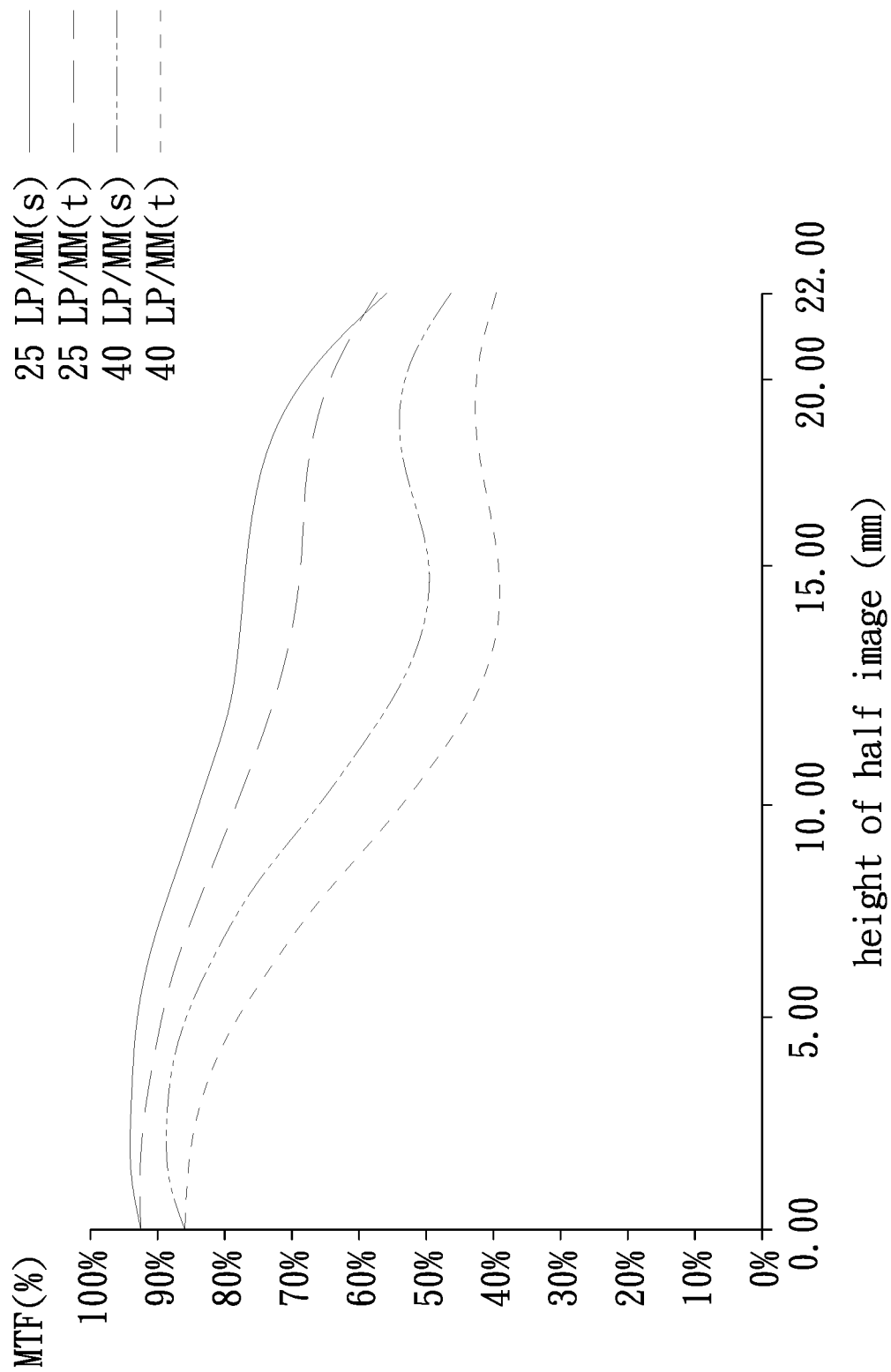
FIG. 4C is a plot of the modulation transfer function of an embodiment of the imaging lens in FIG. 3.

FIG. 4A is a plot of the astigmatism and curvature of field of an embodiment of the imaging lens in FIG. 3, FIG. 4B is a plot of the distortion of an embodiment of the imaging lens in FIG. 3, and FIG. 4C is a plot of the modulation transfer function of an embodiment of the imaging lens in FIG. 3. As shown in FIGS. 4A to 4C, the imaging lens 100a of the present embodiment has good imaging quality while meeting the requirements of cost and size.

Figure 5:
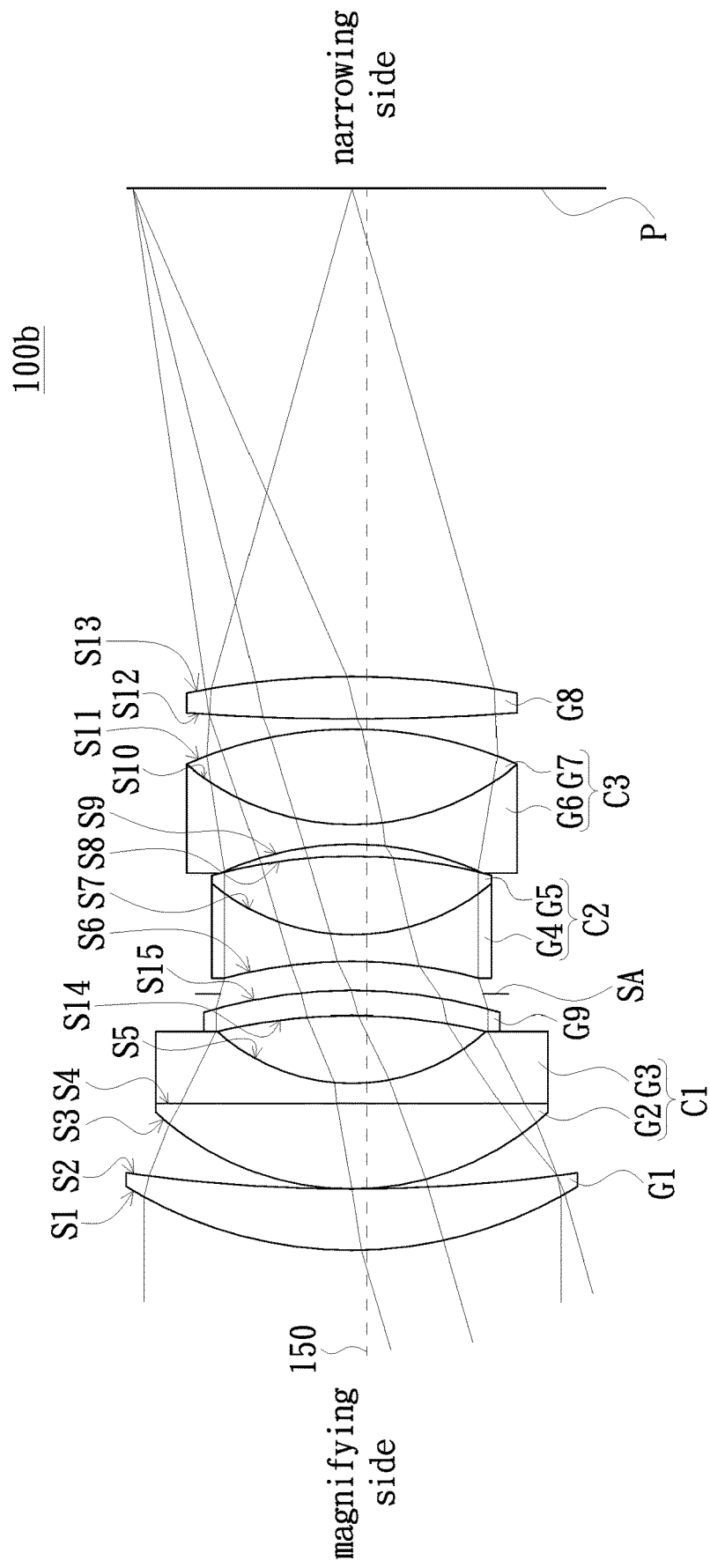
FIG. 5 is a schematic view of an imaging lens in accordance with another embodiment of the present invention.

FIG. 5 is a schematic view of an imaging lens in accordance with another embodiment of the present invention. Referring to FIG. 5. The imaging lens 100b of the present embodiment is similar to the imaging lens 100 of FIG. 1, and the main difference between the two is that the imaging lens 100b further includes a ninth lens G9 disposed between the aperture stop SA and the third lens G3. The ninth lens G9 of the present embodiment has, for example, a positive refractive power. However, the ninth lens G9 may have a negative refractive power in another embodiment. In addition, in another embodiment, the ninth lens G9 may be disposed between the aperture stop SA and the fourth lens G4.

Table 3 illustrates an embodiment of the parameters of the imaging lens 100b. It is to be noted that the data listed in Table 2 is not intended to limit the present invention. That is, any person skilled in the art can make an appropriate change to the parameters or settings after reference to the present invention, and the changed parameters or settings are still within the scope of the present invention.

TABLE 3

| Element | Surface | Radius of Curvature (mm) | Spacing (mm) | Refractive Index | Abbe Number |
|---|---|---|---|---|---|
| G1 | S1 | 42.1 | 6.2 | 1.92 | 20.8 |
|  | S2 | 152.6 | 0.1 |  |  |
| G2 | S3 | 29.25 | 8.3 | 1.77 | 50.7 |
| G3 | S4 | 5315 | 2 | 1.91 | 23.3 |
|  | S5 | 20.06 | 6.5 |  |  |
| G9 | S14 | −61.1 | 2.4 | 1.75 | 52.3 |
|  | S15 | −48.8 | 2 |  |  |
| SA | SA | Infinitely Large | 3.5 |  |  |
| G4 | S6 | −52.15 | 2.7 | 1.88 | 19.2 |

TABLE 3-continued

| Element | Surface | Radius of Curvature (mm) | Spacing (mm) | Refractive Index | Abbe Number |
|---|---|---|---|---|---|
| G5 | S7 | 21.21 | 7.5 | 1.81 | 46.1 |
|  | S8 | −57.85 | 1.4 |  |  |
| G6 | S9 | −30.58 | 2 | 1.88 | 20.3 |
| G7 | S10 | 26.53 | 9 | 1.92 | 20.3 |
|  | S11 | −44.35 | 1.1 |  |  |
| G8 | S12 | 259.1 | 4 | 1.92 | 20.3 |
|  | S13 | −87.87 | 45.25 |  |  |

Figures 6A, 6B:
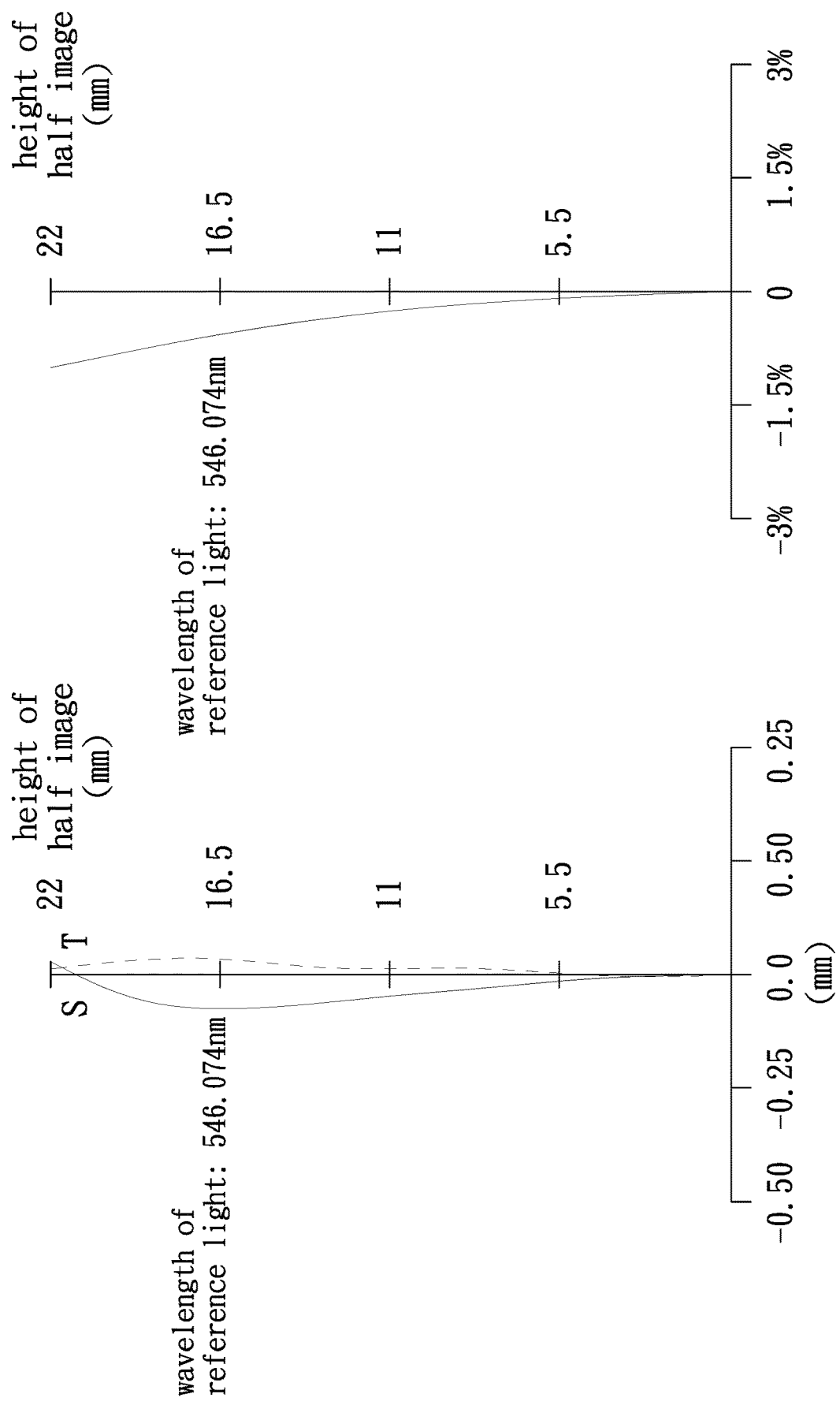
FIG. 6A is a plot of the astigmatism and curvature of field of an embodiment of the imaging lens in FIG. 5.
FIG. 6B is a plot of the distortion of an embodiment of the imaging lens in FIG. 5.

FIG. 6A is a plot of the astigmatism and curvature of field of an embodiment of the imaging lens in FIG. 5, FIG. 6B is a plot of the distortion of an embodiment of the imaging lens in FIG. 5, and FIG. 6C is a plot of the modulation transfer function of an embodiment of the imaging lens in FIG. 5. As shown in FIGS. 6A to 6C, the imaging lens 100b of the present embodiment has good imaging quality while meeting the requirements of cost and size.

Figure 7:
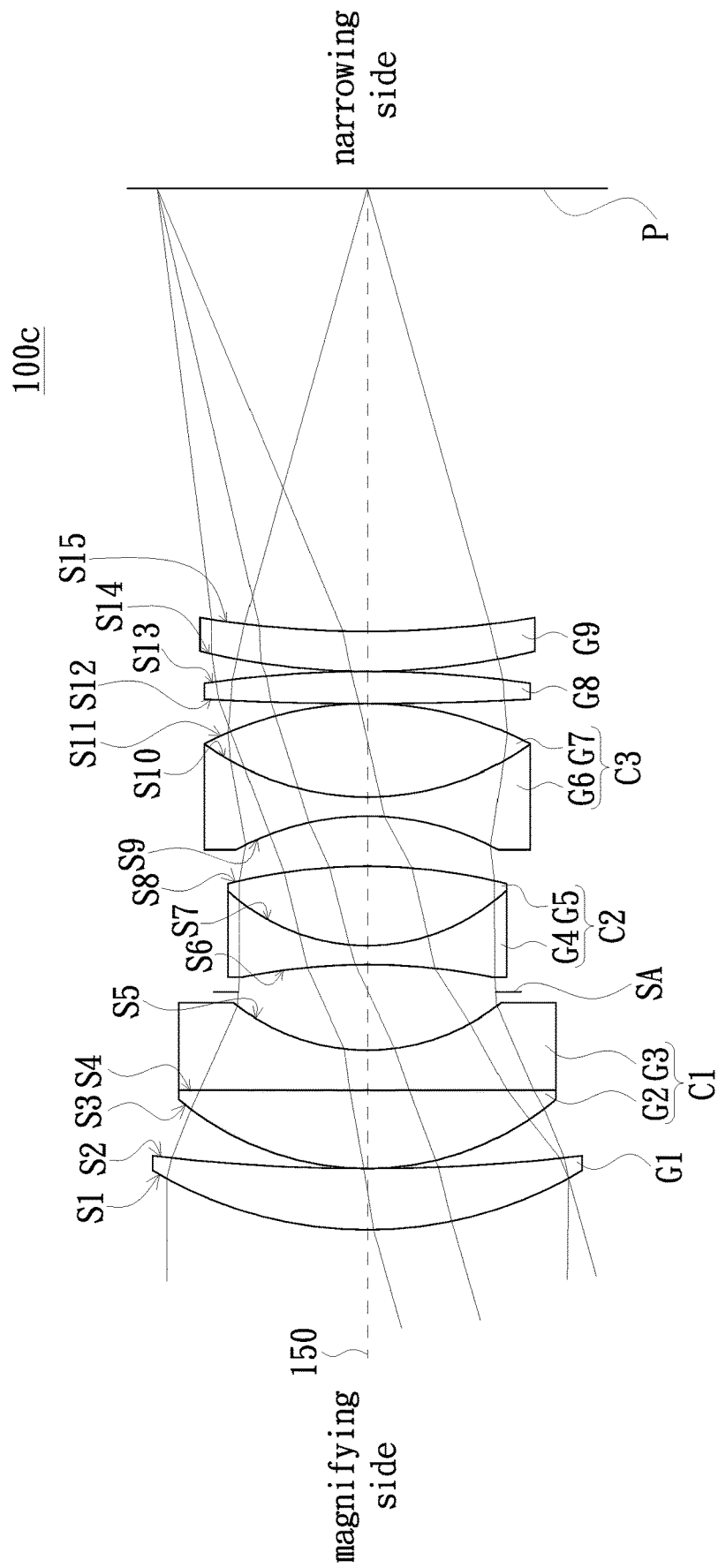
FIG. 7 is a schematic view of an imaging lens in accordance with another embodiment of the present invention.

FIG. 7 is a schematic view of an imaging lens in accordance with another embodiment of the present invention. Referring to FIG. 7. The imaging lens 100c of the present embodiment is similar to the imaging lens 100 of FIG. 1, and the main difference between the two is that the imaging lens 100c further includes a ninth lens G9 disposed between the eighth lens G8 and the narrowing side. The ninth lens G9 of the present embodiment has, for example, a positive refractive power. However, the ninth lens G9 may have a negative refractive power in another embodiment. In addition, in another embodiment, the ninth lens G9 may be disposed between the seventh lens G7 and the eighth lens G8. In addition, when the ninth lens G9 is disposed between the seventh lens G7 and the eighth lens G8 or between the eighth lens G8 and the narrowing side, the material of the ninth lens G9 includes, for example, a lanthanide glass, a dense lanthanide glass or a dense flint glass.

Table 4 illustrates an embodiment of the parameters of the imaging lens 100c. It is to be noted that the data listed in Table 2 is not intended to limit the present invention. That is, any person skilled in the art can make an appropriate change to the parameters or settings after reference to the present invention, and the changed parameters or settings are still within the scope of the present invention.

TABLE 4

| Element | Surface | Radius of Curvature (mm) | Spacing (mm) | Refractive Index | Abbe Number |
|---|---|---|---|---|---|
| G1 | S1 | 42.8 | 6.2 | 1.92 | 20.3 |
|  | S2 | 180 | 0.1 |  |  |
| G2 | S3 | 30.8 | 7.7 | 1.62 | 60.3 |
| G3 | S4 | 716 | 4 | 1.92 | 23.5 |
|  | S5 | 22.3 | 6.2 |  |  |
| SA | SA | Infinitely Large | 2.8 |  |  |
| G4 | S6 | −66.5 | 2 | 1.82 | 20.4 |
| G5 | S7 | 20.6 | 8 | 1.83 | 44.1 |
|  | S8 | −63.58 | 5 |  |  |
| G6 | S9 | −28.6 | 2 | 1.87 | 22.2 |
| G7 | S10 | 29.38 | 9.54 | 1.89 | 18.9 |
|  | S11 | −37.2 | 0.1 |  |  |
| G8 | S12 | 410 | 3.2 | 1.88 | 40.8 |
|  | S13 | −120.3 | 0.1 |  |  |
| G9 | S14 | 79.54 | 4 | 1.88 | 40.8 |
|  | S15 | 96.45 | 44.35 |  |  |

Figures 8A, 8B:
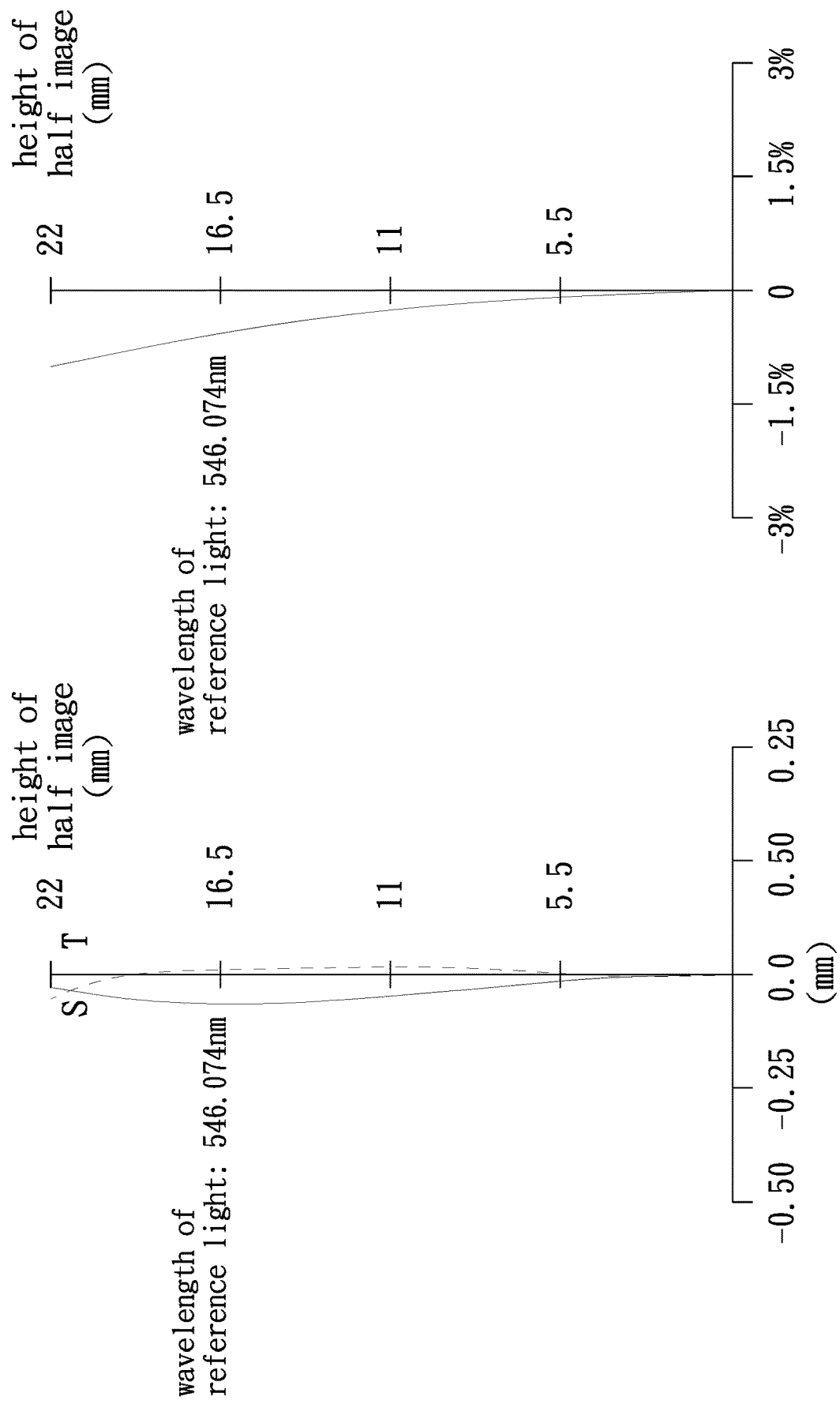
FIG. 8A is a plot of the astigmatism and curvature of field of an embodiment of the imaging lens in FIG. 7.
FIG. 8B is a plot of the distortion of an embodiment of the imaging lens in FIG. 7.
Figure 8C:
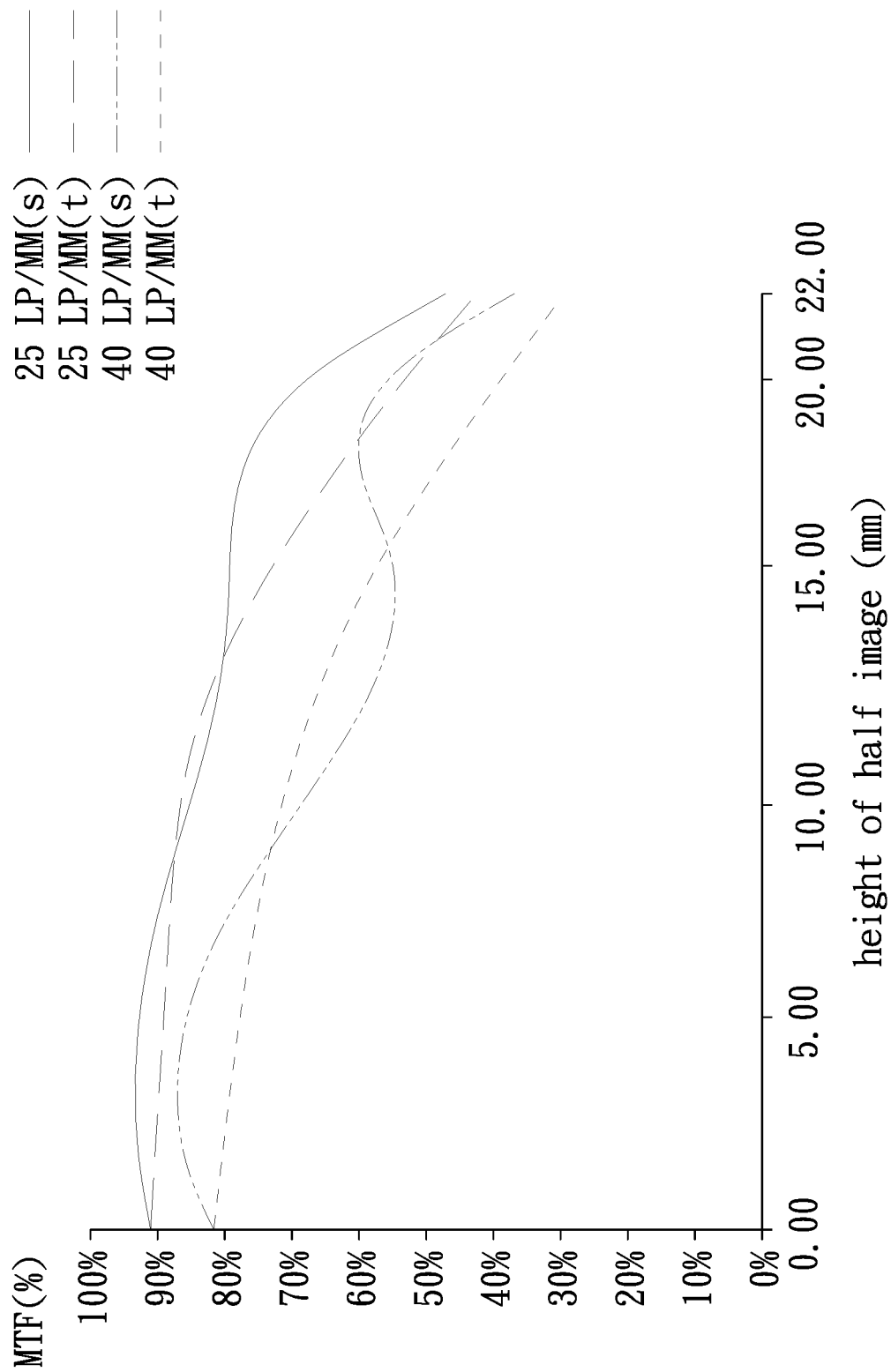
FIG. 8C is a plot of the modulation transfer function of an embodiment of the imaging lens in FIG. 7.

FIG. 8A is a plot of the astigmatism and curvature of field of an embodiment of the imaging lens in FIG. 7, FIG. 8B is a plot of the distortion of an embodiment of the imaging lens in FIG. 7, and FIG. 8C is a plot of the modulation transfer function of an embodiment of the imaging lens in FIG. 7. As shown in FIGS. 8A to 8C, the imaging lens 100c of the present embodiment has good imaging quality while meeting the requirements of cost and size.

Figure 9:
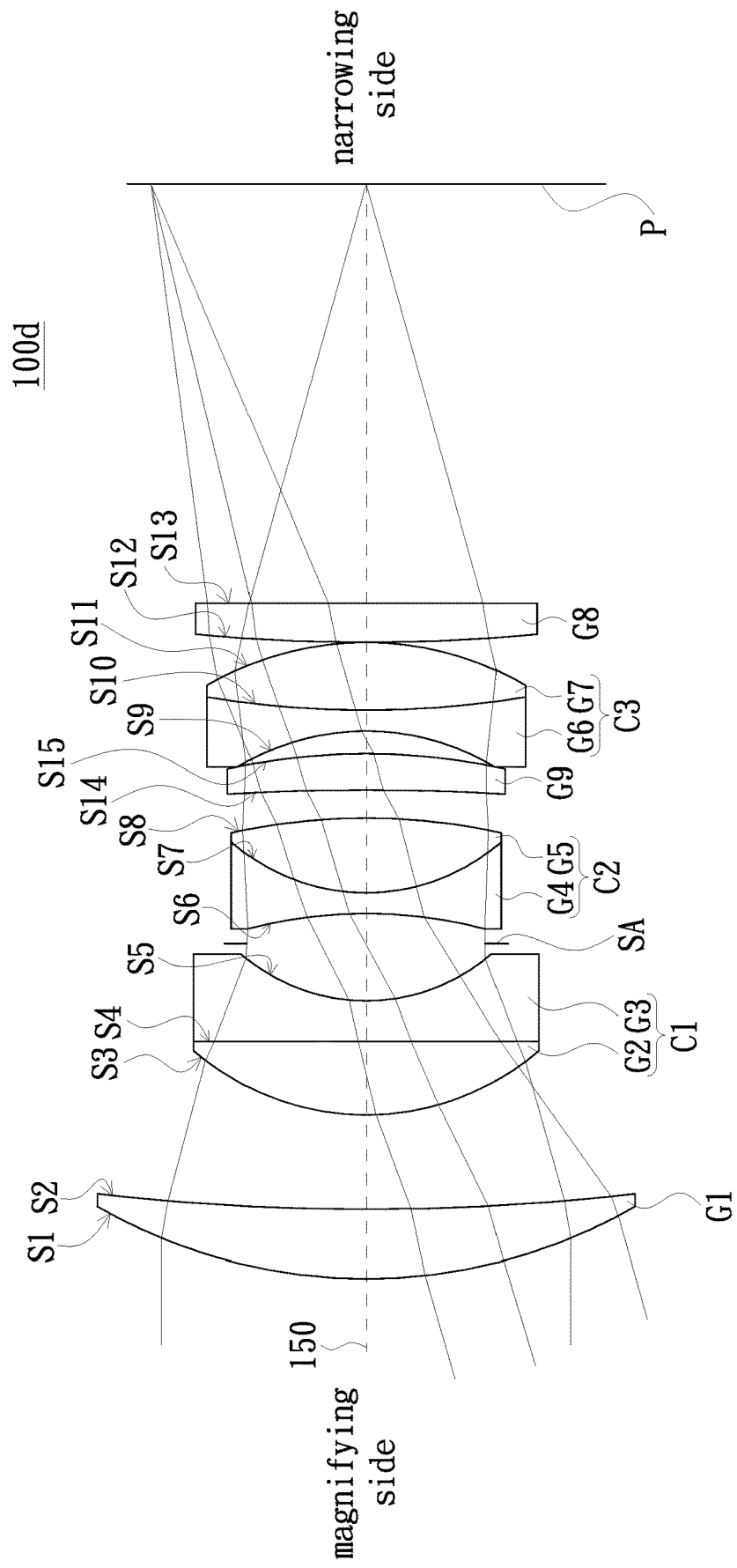
FIG. 9 is a schematic view of an imaging lens in accordance with another embodiment of the present invention.

FIG. 9 is a schematic view of an imaging lens in accordance with another embodiment of the present invention. Referring to FIG. 9. The imaging lens 100d of the present embodiment is similar to the imaging lens 100 of FIG. 1, and the main difference between the two is that the imaging lens 100d further includes a ninth lens G9 disposed between the fifth lens G5 and the sixth lens G6. The ninth lens G9 of the present embodiment has, for example, a positive refractive power and may be a meniscus shaped lens or a biconvex lens. The material of the ninth lens G9 includes a lanthanide glass or a dense lanthanide glass, but is not limited thereto.

Table 5 illustrates an embodiment of the parameters of the imaging lens 100d. It is to be noted that the data listed in Table 2 is not intended to limit the present invention. That is, any person skilled in the art can make an appropriate change to the parameters or settings after reference to the present invention, and the changed parameters or settings are still within the scope of the present invention.

TABLE 5

| Element | Surface | Radius of Curvature (mm) | Spacing (mm) | Refractive Index | Abbe Number |
|---|---|---|---|---|---|
| G1 | S1 | 52.95 | 7 | 1.88 | 40.8 |
|  | S2 | 229.45 | 9 |  |  |
| G2 | S3 | 26.4 | 7.4 | 1.49 | 88.3 |
| G3 | S4 | Infinitely Large | 4 | 1.8 | 27.5 |
|  | S5 | 19.12 | 5.7 |  |  |
| SA | SA | Infinitely Large | 2.9 |  |  |
| G4 | S6 | −49.68 | 2.1 | 1.75 | 27.5 |
| G5 | S7 | 19.46 | 7.5 | 1.75 | 52.3 |
|  | S8 | −60.4 | 2.8 |  |  |
| G9 | S14 | −212.68 | 3.6 | 1.75 | 52.3 |
|  | S15 | −60.67 | 2.2 |  |  |
| G6 | S9 | −24.9 | 2.1 | 1.64 | 32.1 |
| G7 | S10 | 93.81 | 6.7 | 1.88 | 23.8 |
|  | S11 | −31.59 | 0.1 |  |  |
| G8 | S12 | 184.51 | 4 | 1.88 | 40.8 |
|  | S13 | Infinitely Large | 41.73 |  |  |

Figures 10A, 10B:
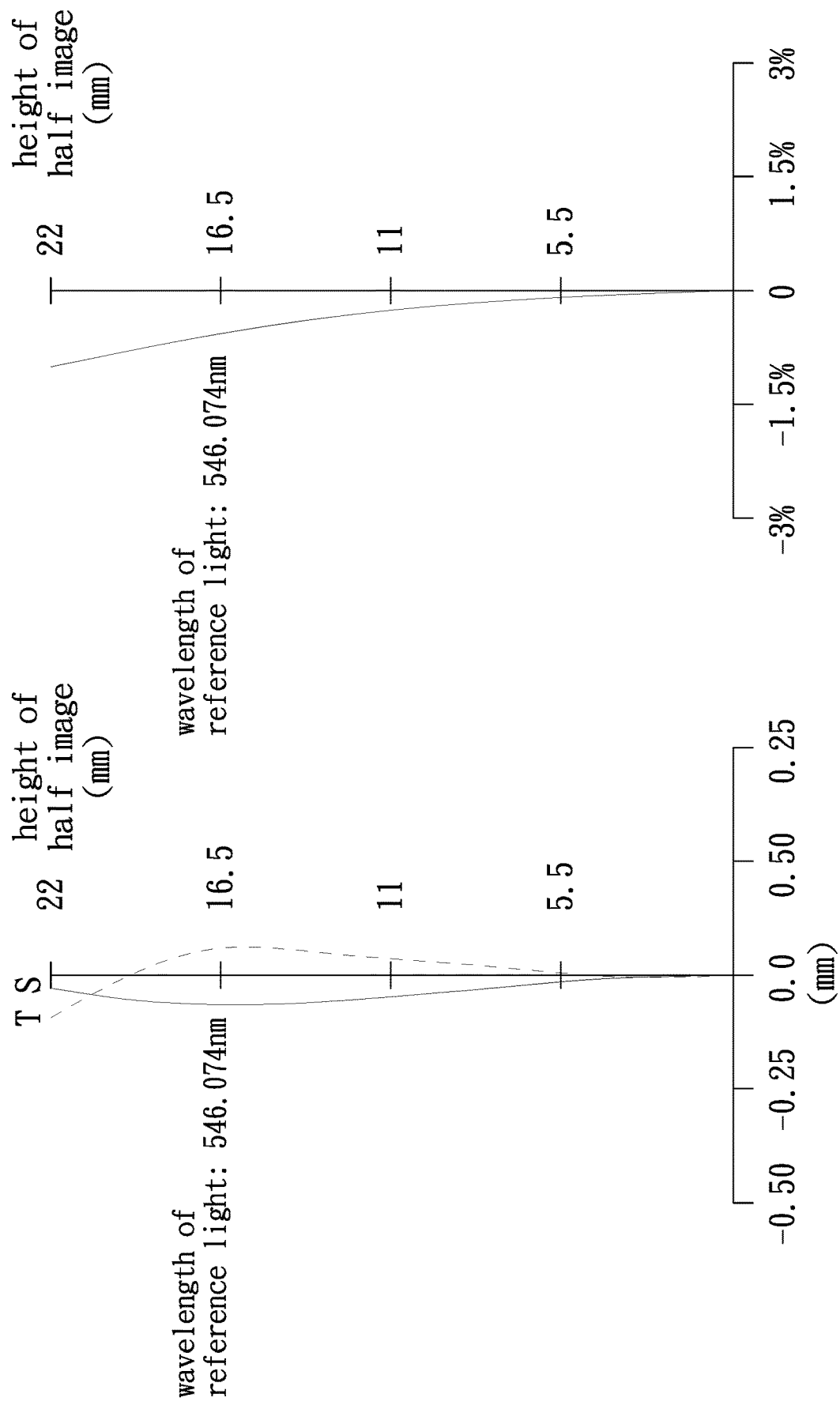
FIG. 10A is a plot of the astigmatism and curvature of field of an embodiment of the imaging lens in FIG. 9.
FIG. 10B is a plot of the distortion of an embodiment of the imaging lens in FIG. 9.
Figure 10C:
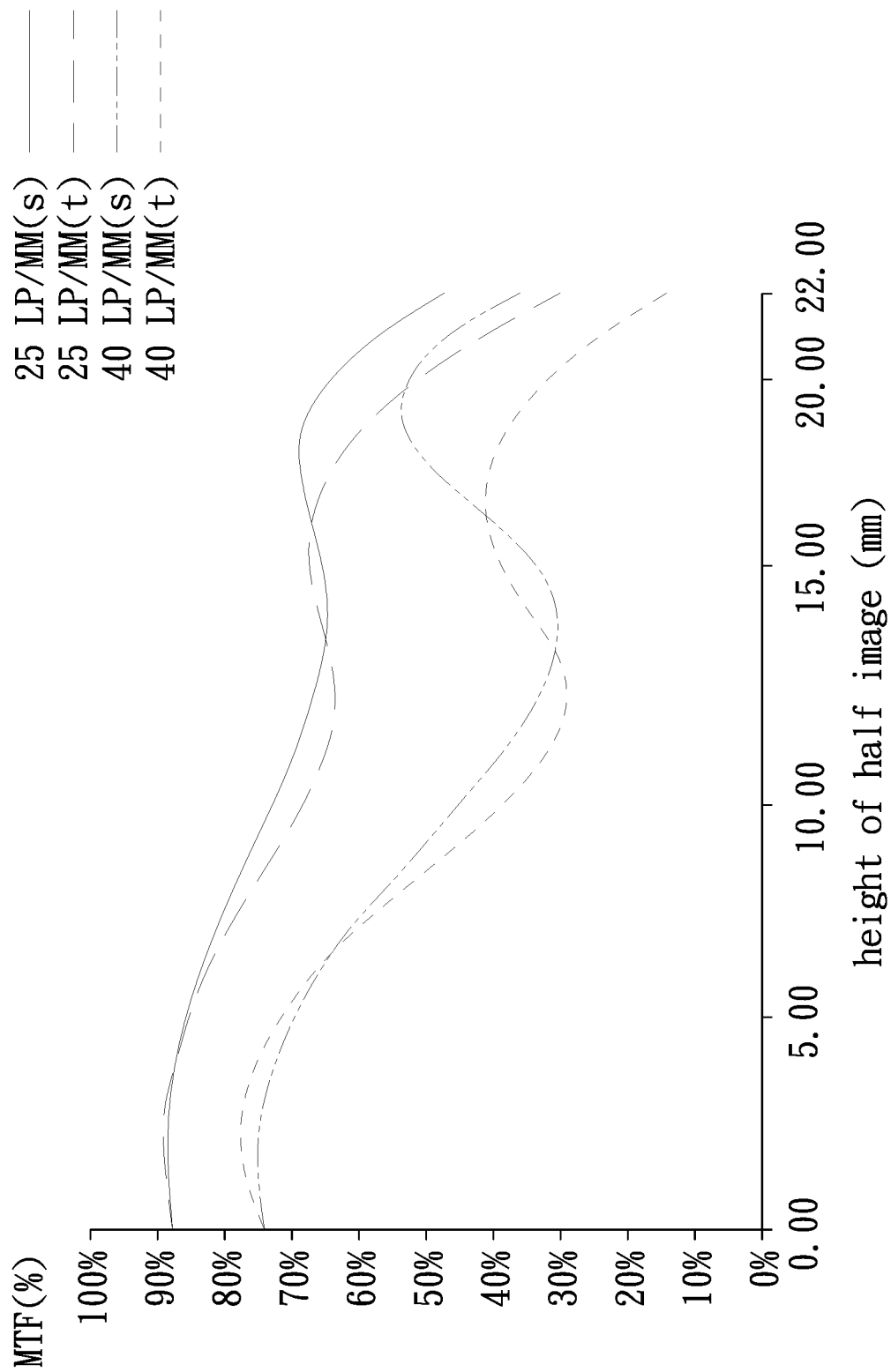
FIG. 10C is a plot of the modulation transfer function of an embodiment of the imaging lens in FIG. 9.

FIG. 10A is a plot of the astigmatism and curvature of field of an embodiment of the imaging lens in FIG. 9, FIG. 10B is a plot of the distortion of an embodiment of the imaging lens in FIG. 9, and FIG. 10C is a plot of the modulation transfer function of an embodiment of the imaging lens in FIG. 9. As shown in FIGS. 10A to 10C, the imaging lens 100d of the present embodiment has good imaging quality while meeting the requirements of cost and size.

The imaging lens of the present invention is advantageous in its low cost as only at least eight lenses are required. Further, by constituting six of the eight lenses as three composite lenses, the total length of the imaging lens can be reduced. Therefore, the imaging lens of the present invention can have good imaging quality while meeting the requirements of cost and size.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An imaging lens, comprising:
    a first lens, having a positive refractive power, a refractive index chosen from 1.88 and 1.92, and an Abbe number chosen from 20.9, 20.8, 20.3, and 40.8, and a material of the first lens comprises a flint glass or a dense flint glass, wherein when the refractive index is 1.88 the Abbe number is 40.8, when the refractive index is 1.92 the Abbe number is 20.9, 20.8, or 20.3;
    a second lens;
    a third lens;
    a fourth lens;
    a fifth lens;
    a sixth lens;
    a seventh lens; and
    an eighth lens, having a positive refractive power, a refractive index of 1.88, and an Abbe number of 40.8, and a material of the eighth lens comprises a lanthanide glass, a dense lanthanide glass or a dense flint glass;
    wherein the first lens, the second lens, the third lens, the fourth lens, the fifth lens, the sixth lens, the seventh lens and the eighth lens are sequentially arranged from a magnifying side to a narrowing side, the second lens and the third lens constitute a first composite lens, the fourth lens and the fifth lens constitute a second composite lens, and the sixth lens and the seventh lens constitute a third composite lens;
    wherein a material of one of the second lens and the third lens comprises a crown glass, and a material of another one of the second lens and the third lens comprises a dense flint glass; a material of one of the fourth lens and the fifth lens comprises a flint glass, and a material of another one of the fourth lens and the fifth lens comprises a crown glass; and a material of the sixth lens and the seventh lens comprises a flint glass, wherein the sixth lens has a negative refractive power, the seventh lens has a positive refractive power, the flint glass of the sixth lens and the seventh lens has a refractive index between 1.63 and 2.1.

2. The imaging lens according to claim 1, wherein the second lens has a positive refractive power, the third lens has a negative refractive power or a positive refractive power, the fourth lens has a negative refractive power, and the fifth lens has a positive refractive power.

3. The imaging lens according to claim 2, wherein the first lens is a biconvex lens or a meniscus shaped lens or a plano-convex lens bulging toward the magnifying side.

4. The imaging lens according to claim 2, wherein a surface of the second lens facing the magnifying side is a convex curved surface, a surface of the third lens facing the narrowing side is a concave curved surface, and a joining surface between the second lens and the third lens is a flat surface or a curved surface bulging toward the magnifying side or the narrowing side.

5. The imaging lens according to claim 2, wherein a surface of the fourth lens facing the magnifying side is a concave curved surface, a surface of the fifth lens facing the narrowing side is a convex curved surface, and a joining surface between the fourth lens and the fifth lens is a curved surface bulging toward the magnifying side.

6. The imaging lens according to claim 2, wherein a surface of the sixth lens facing the magnifying side is a concave curved surface, a surface of the seventh lens facing the narrowing side is a convex curved surface, and a joining surface between the sixth lens and the seventh lens is a flat surface or a curved surface bulging toward the magnifying side or the narrowing side.

7. The imaging lens according to claim 2, wherein the eighth lens is a biconvex lens, a meniscus shaped lens or a plano-convex lens.

8. The imaging lens according to claim 2, wherein an angle of a full field of view of the imaging lens is between 10 degrees and 50 degrees.

9. The imaging lens according to claim 1, further comprising an aperture stop disposed between the third lens and the fourth lens.

10. The imaging lens according to claim 9, further comprising a ninth lens disposed in one of a plurality of positions, comprising a position between the fifth lens and the sixth lens, a position between the first lens and the magnifying side, a position between the first lens and the second lens, a position between the seventh lens and the eighth lens, a position between the eighth lens and the narrowing side, a position between the third lens and the aperture stop, and a position between the aperture stop and the fourth lens.

11. The imaging lens according to claim 10, wherein the ninth lens is disposed between the fifth lens and the sixth lens, and the ninth lens is a meniscus shaped lens or a biconvex lens having a positive refractive power.

12. The imaging lens according to claim 10, wherein:
when the ninth lens is disposed between the first lens and the magnifying side or between the first lens and the second lens, a material of the ninth lens comprises a crown glass, a light crown glass or a fluorine crown glass;
when the ninth lens is disposed between the seventh lens and the eighth lens or between the eighth lens and the narrowing side, a material of the ninth lens comprises a lanthanide glass, a dense lanthanide glass or a dense flint glass; and
when the ninth lens is disposed between the fifth lens and the sixth lens, a material of the ninth lens comprises a lanthanide glass or a dense lanthanide glass.

13. An imaging lens, comprising:
a first lens, having a positive refractive power, a refractive index of 1.92, and an Abbe number of 20.8, and a material of the first lens comprises a flint glass or a dense flint glass;
a second lens;
a third lens;
a fourth lens;
a fifth lens;
a sixth lens;
a seventh lens; and
an eighth lens, having a positive refractive power, a refractive index of 1.92, and an Abbe number of 20.3, and a material of the eighth lens comprises a lanthanide glass, a dense lanthanide glass or a dense flint glass;
wherein the first lens, the second lens, the third lens, the fourth lens, the fifth lens, the sixth lens, the seventh lens and the eighth lens are sequentially arranged from a magnifying side to a narrowing side, the second lens and the third lens constitute a first composite lens, the fourth lens and the fifth lens constitute a second composite lens, and the sixth lens and the seventh lens constitute a third composite lens;
wherein a material of one of the second lens and the third lens comprises a crown glass, and a material of another one of the second lens and the third lens comprises a dense flint glass; a material of one of the fourth lens and the fifth lens comprises a flint glass, and a material of another one of the fourth lens and the fifth lens comprises a crown glass; and a material of the sixth lens and the seventh lens comprises a flint glass, wherein the sixth lens has a negative refractive power, the seventh lens has a positive refractive power, the flint glass of the sixth lens and the seventh lens has a refractive index between 1.63 and 2.1.

* * * * *